United States Patent
Lo et al.

(10) Patent No.: US 8,321,922 B1
(45) Date of Patent: Nov. 27, 2012

(54) AUTHENTICATING A USER OF A SYSTEM USING NEAR FIELD COMMUNICATION

(75) Inventors: Yung-Chieh Lo, Taipei (TW); Vincent Wu, Belmont, CA (US); Cheng-Hsueh Andrew Hsieh, Taipei (TW); Chinyue Chen, New Taipei (TW)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,764

(22) Filed: Sep. 26, 2011

Related U.S. Application Data

(63) Continuation of application No. 13/235,310, filed on Sep. 16, 2011.

(51) Int. Cl.
G06F 7/04 (2006.01)
H04L 9/32 (2006.01)
H04M 1/66 (2006.01)

(52) U.S. Cl. ............... 726/7; 713/168; 455/411
(58) Field of Classification Search ...... 726/7; 713/168; 455/411
See application file for complete search history.

(56) References Cited

U.S. PATENT DOCUMENTS

| | | | |
|---|---|---|---|
| 7,176,802 B2 * | 2/2007 | Fukuoka et al. | 340/572.7 |
| 7,388,481 B1 * | 6/2008 | Cahn | 340/505 |
| 7,588,185 B2 * | 9/2009 | Berquist et al. | 235/385 |
| 2005/0109841 A1 * | 5/2005 | Ryan et al. | 235/380 |
| 2006/0219776 A1 * | 10/2006 | Finn | 235/380 |
| 2007/0255652 A1 * | 11/2007 | Tumminaro et al. | 705/39 |
| 2008/0011833 A1 * | 1/2008 | Saarisalo | 235/382 |
| 2008/0041937 A1 * | 2/2008 | Vawter | 235/380 |
| 2008/0090540 A1 * | 4/2008 | Rofougaran | 455/289 |
| 2008/0220878 A1 | 9/2008 | Michaelis | |
| 2008/0230615 A1 * | 9/2008 | Read et al. | 235/492 |
| 2008/0238610 A1 * | 10/2008 | Rosenberg | 340/5.7 |
| 2008/0274757 A1 * | 11/2008 | Lovell | 455/466 |
| 2009/0144456 A1 * | 6/2009 | Gelf et al. | 710/8 |
| 2009/0243812 A1 * | 10/2009 | Yamamoto | 340/10.41 |
| 2009/0243814 A1 * | 10/2009 | Yamamoto | 340/10.52 |
| 2009/0276300 A1 * | 11/2009 | Shaw et al. | 705/14.1 |
| 2010/0082481 A1 * | 4/2010 | Lin et al. | 705/41 |
| 2010/0082491 A1 * | 4/2010 | Rosenblatt et al. | 705/65 |
| 2010/0082567 A1 | 4/2010 | Rosenblatt et al. | |
| 2010/0249987 A1 * | 9/2010 | Hong et al. | 700/215 |
| 2010/0283584 A1 * | 11/2010 | McAllister | 340/10.1 |
| 2011/0165859 A1 * | 7/2011 | Wengrovitz | 455/411 |
| 2011/0235085 A1 | 9/2011 | Jazayeri et al. | |
| 2011/0276402 A1 * | 11/2011 | Boone et al. | 705/14.58 |
| 2011/0313922 A1 | 12/2011 | Ben Ayed | |

OTHER PUBLICATIONS

"NFC Data Exchange Format (NDEF) Technical Specification", NFC Forum, Jul. 24, 2006, NDEF 1.0, NFCForum-TS-NDEF_1.0.
"NFC Record Type Definition (RTD) Technical Specification", NFC Forum, Jul. 24, 2006, RTD 1.0, NFCForum-TS-RTD_1.0.
"Text Record Type Definition Technical Specification", NFC Forum, Jul. 24, 2006, RTD-Text 1.0, NFCForum-TS-RTD_Text_1.0.

(Continued)

*Primary Examiner* — Techane Gergiso
(74) *Attorney, Agent, or Firm* — McDermott Will & Emery LLP

(57) ABSTRACT

A system and machine-implemented method for providing a username and password to a system using a device, via establishing a near field communication link with the system; retrieving a username and password from storage on the device; and transmitting the username and password to the system via the near field communication link, wherein the username and password are configured to be used by the system to authenticate the user on the system.

14 Claims, 5 Drawing Sheets

OTHER PUBLICATIONS

"URI Record Type Definition Technical Specification", NFC Forum, Jul. 24, 2006, RTD-URI 1.0, NFCForum-TS-RTD_URI_1.0.

"Near field communication", Wikipedia, the free encyclopedia, print date Nov. 22, 2011, pp. 1-22, retrieved from <http://en.wikipedia.org/wiki/Near_field_communication>.

"Information technology—Telecommunications and information exchange between systems—Near Field Communication—Interface and Protocol", International Standard, ISO/IEC 18092, Apr. 1, 2004, First Edition.

* cited by examiner

AUTHENTICATING A USER OF A SYSTEM USING NEAR FIELD COMMUNICATION

CROSS REFERENCE TO RELATED APPLICATIONS

The present application is a continuation of and claims the benefit of priority under 35 U.S.C. §120 from U.S. patent application Ser. No. 13/235,310 entitled "Authenticating a User of a System Using Near Field Communication", filed on Sep. 16, 2011, the disclosure of which is hereby incorporated by reference in its entirety for all purposes.

BACKGROUND

The present disclosure generally relates to user authentication on a system, and, in particular, providing authentication information to the system via near field communication.

In the field of computing, a user may be required to input confidential information on a system for different reasons. In one example, the user may be required to type in a username and password when initially logging into a computer or computer network. In another example, the user may have to manually provide a username and password when logging into certain websites on the system. In yet another example, the user may be required to provide credit card information when shopping online on the system.

In the above examples, the inputting of authentication information can be inconvenient for the user and insecure for the system. Thus, it may be beneficial to lessen user burden and increase system security when authenticating a user on a system.

SUMMARY

The disclosed subject matter relates to a machine-implemented method for providing a username and password to a system using a device, via establishing a near field communication link with the system; retrieving a username and password from storage on the device; and transmitting the username and password to the system via the near field communication link, wherein the username and password are configured to be used by the system to authenticate the user on the system.

The disclosed subject matter further relates to a device for providing a token for user authentication to a system, the device comprising one or more processors; and a machine-readable medium comprising instructions stored therein, which when executed by the processors, cause the processors to perform operations comprising establishing a near field communication link with the system; retrieving a token from storage on the device, the token having been received from the system based on a prior user authentication on the system; and transmitting the token to the system via the near field communication link, wherein the token is configured to be used by the system to authenticate the user on the system.

The disclosed subject matter also relates to a machine-readable medium comprising instructions stored therein, which when executed by a device, cause the device to perform operations comprising receiving a token from a system based on a prior user authentication on the system; storing the token on the device; establishing a near field communication link with the system; retrieving the token from storage on the device; and transmitting the token to the system via the near field communication link, wherein the token is configured to be used by the system to authenticate the user on the system.

The disclosed subject matter also relates to a machine-implemented method for authenticating a user on a system, via requesting a username and password to authenticate a user on the system; establishing a near field communication link with a device; receiving the username and password from the device via the near field communication link; and performing authentication of the user using the username and password.

The disclosed subject matter also relates to a system for authenticating a user, the system comprising one or more processors; and a machine-readable medium comprising instructions stored therein, which when executed by the processors, cause the processors to perform operations comprising establishing a near field communication link with a device; receiving a token stored on the device, wherein the token is based on a prior user authentication on the system; retrieving authentication information from storage on the system in response to receiving the token, wherein the authentication information is based on a username and password for authenticating the user; and performing authentication of the user using the retrieved authentication information.

The disclosed subject matter also relates to a machine-readable medium comprising instructions stored therein, which when executed by a system, cause the system to perform operations comprising requesting a username and password to authenticate a user on the system; establishing a near field communication link with a device; receiving a token stored on the device, wherein the token is based on a prior user authentication on the system; retrieving authentication information from storage on the system in response to receiving the token, wherein the authentication information is based on the username and password; and performing authentication of the user using the retrieved authentication information.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
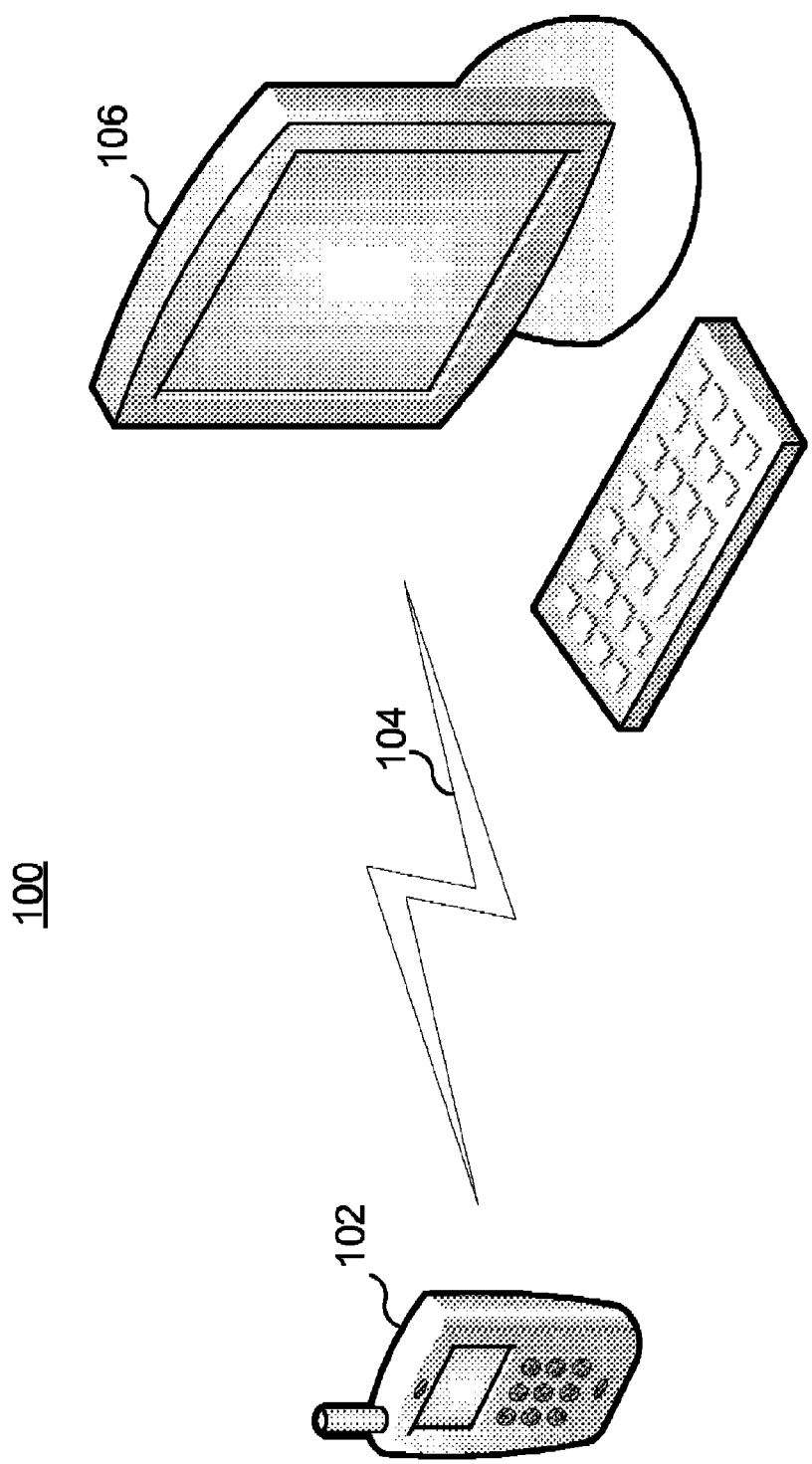
FIG. 1 is a depiction of a computing environment which provides for user authentication according to an example embodiment.

FIG. 1 is a depiction of a computing environment which provides for user authentication according to an example embodiment. Computing environment 100 can include an electronic device 102 and a computing system 106 which are in communication with each other via communication link 104. Thus, computing environment 100 can allow for electronic device 102 to provide authentication information (e.g., in the form of a username and password, or in the form of a token) to computing system 106 via communication link 104.

Computing system 106 may be able to access a network such as a local area network (LAN) or a wide area network (WAN), an intranet, or a network of networks, such as the Internet. In this regard, it may at times be necessary to authenticate a user of computing system 106. For example, the user may be required to type in a username and password when initially logging into computing system 106 or a computer network accessible to computing system 106. In another example, the user may have to manually provide a username and password when logging into certain websites accessible by computing system 106. The user may also be required to provide credit card information when shopping online using computing system 106.

Electronic device 102 can communicate with computing device 106 through communication link 104. Communication link 104 can correspond to a near field communication (NFC) link, to enable near field communication between electronic device 102 and computing system 106.

In this regard, NFC is a short-range wireless communication technology. In NFC, a "reader" and "tag" typically exchange data only when they are within a specific distance of one another. In this regard, NFC typically requires a distance of 4 cm or less. Thus, data communications terminate either by a command from an application using the NFC link, or when the communicating devices move out of range.

With reference to FIG. 1, using communication link 104, authentication information can be transmitted from electronic device 102 to computing system 106. The authentication information can be in the form of a username and password, either of which can be encrypted. The authentication information can also be in the form of a token, session key or cookie. While the subject disclosure references a token herein, it should be understood that a session key or cookie can be employed instead of a token.

Each of electronic device 102 and computing system 106 can be a computer, phone, PDA, or any other sort of electronic device. In the example of FIG. 1, electronic device 102 is depicted as a handheld device while computing system 106 is depicted as a computer.

Figure 2:
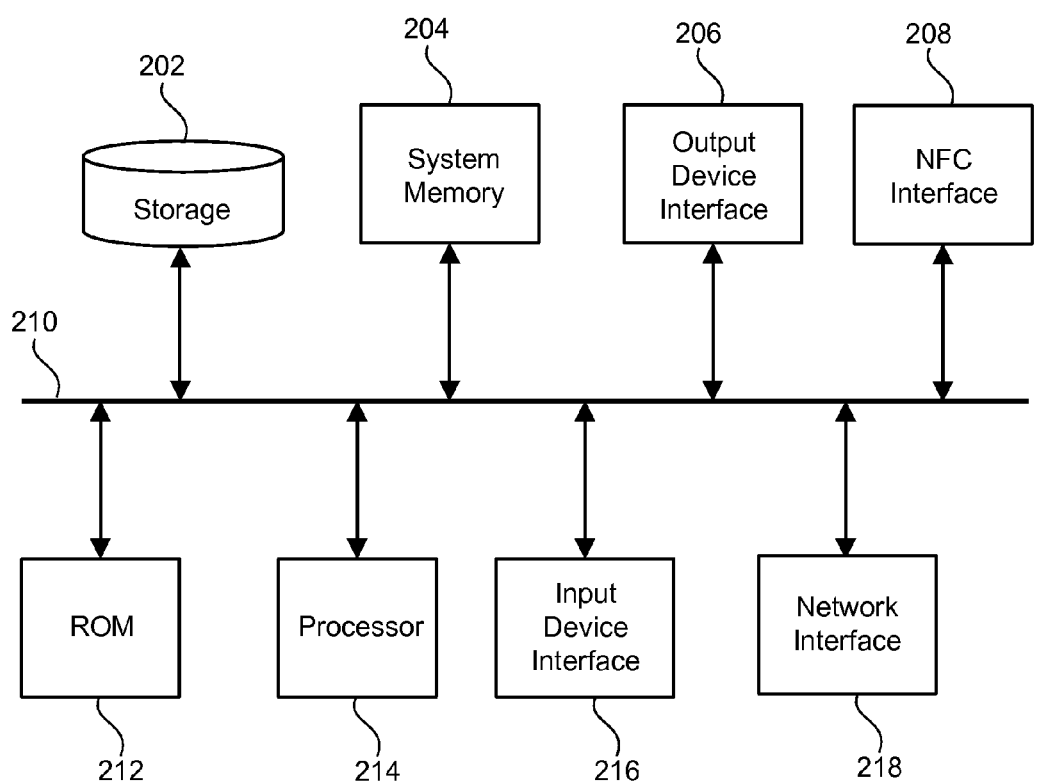
FIG. 2 conceptually illustrates the architecture of a system with which some implementations of the subject technology can be implemented.

FIG. 2 conceptually illustrates the architecture of a system with which some implementations of the subject technology can be implemented. System 200 can correspond to the architecture of electronic device 102 or to the architecture of computing system 106.

As noted above, system 200 can be a computer, phone, personal digital assistant (PDA), or any other sort of electronic device. System 200 can include various types of computer readable media and interfaces for various other types of computer readable media. System 200 includes a bus 210, processing unit(s) 214, a system memory 204, a read-only memory (ROM) 212, a permanent storage device 202, an input device interface 216, an output device interface 206, an NFC interface 208, and a network interface 218.

Bus 210 collectively represents all system, peripheral, and chipset buses that communicatively connect the numerous internal devices of system 200. For instance, bus 210 communicatively connects processing unit(s) 214 with ROM 212, system memory 204, and permanent storage device 202.

From these various memory units, processing unit(s) 214 retrieves instructions to execute and data to process in order to execute the processes of the subject disclosure. Processing unit(s) 214 can be a single processor or a multi-core processor in different implementations.

ROM 212 stores static data and instructions that are needed by processing unit(s) 214 and other modules of system 200. Permanent storage device 202, on the other hand, is a read-and-write memory device. This device is a non-volatile memory unit that stores instructions and data even when system 200 is off. Some implementations of the subject disclosure use a mass-storage device (such as a magnetic or optical disk and its corresponding disk drive) as permanent storage device 202.

Other implementations use a removable storage device (such as a floppy disk, flash drive, and its corresponding disk drive) as permanent storage device 202. Like permanent storage device 202, system memory 204 is a read-and-write memory device. However, unlike storage device 202, system memory 204 is a volatile read-and-write memory, such a random access memory. System memory 204 stores some of the instructions and data that processing unit(s) 214 needs at runtime. In some implementations, the subject disclosure's processes are stored in system memory 204, permanent storage device 202, and/or read-only memory 212. For example, the various memory units include instructions for establishing an NFC link and for participating in NFC communication in accordance with some implementations. From these various memory units, processing unit(s) 214 retrieves instructions to execute and data to process in order to execute the processes of some implementations.

Bus 210 also connects to the input device interface 216 and output device interface 206. Input device interface 216 enables the user to communicate information and select commands to system 200. Input devices used with input device interface 216 include, for example, alphanumeric keyboards and pointing devices (also called "cursor control devices"). Output device interface 206 enables, for example, the display of images generated by system 200. Output devices used with output device interface 206 include, for example, printers and display devices, such as cathode ray tubes (CRT) or liquid crystal displays (LCD). Some implementations include devices such as a touch screen that functions as both input and output devices.

As shown in FIG. 2, it is possible for bus 210 to couple system 200 to a network (not shown) through a network interface 218. In this manner, system 200 can be a part of a network of computers (e.g., a LAN or WAN), an Intranet, or a network of networks, such as the Internet.

Certain embodiments of system 200 may also include a near field communication (NFC) interface 208 allowing for close range communication. According to example embodiments, NFC interface 208 may comply with such standards as ISO 18092 or ISO 21481, and may have a range of approximately 2 to 4 cm. Of course, NFC interface 208 is not limited to these standards and ranges, and other interfaces allowing for close range communication can be used.

The close range communication with NFC interface 208 may take place via magnetic field induction, allowing NFC interface 208 to communicate with other NFC interfaces 208 or to retrieve information from tags having radio frequency identification (RFID) circuitry. As discussed below, NFC interface 208 may provide a manner for establishing an NFC link between different instances of system 200.

Figure 3:
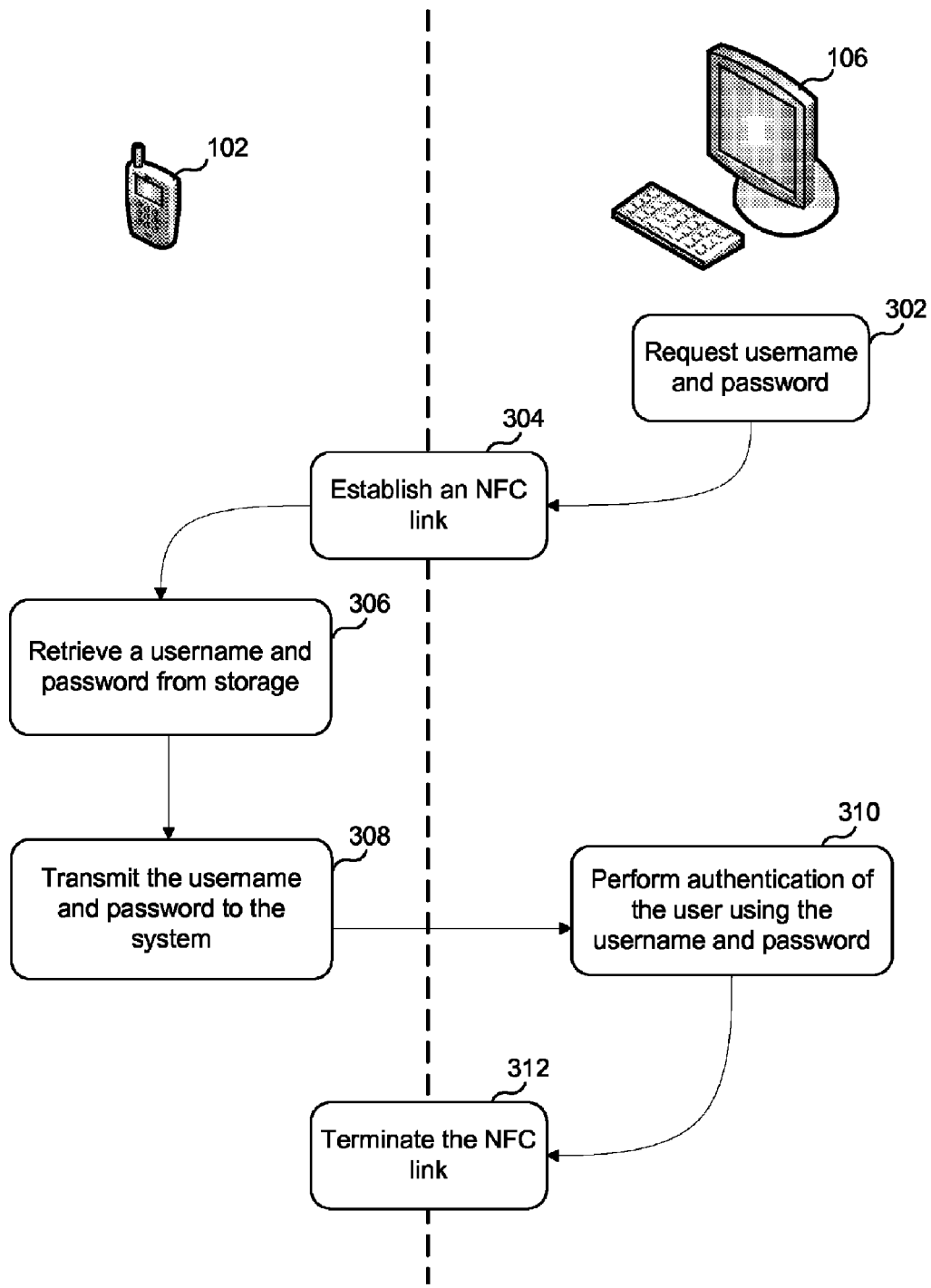
FIG. 3 illustrates a process by which a username and password are provided by an electronic device to a computing system for authentication of a user on the computing system.

FIG. 3 illustrates a process by which a username and password are provided by an electronic device to a computing system for authentication of a user on the computing system. It should be noted that although FIG. 3 depicts computing system 106 as a computer and electronic device 102 as a handheld device, each of computing system 106 and electronic device 102 may represent any embodiment of systems 200. As described above, system 200 can be a computer, phone, personal digital assistant (PDA), or any other sort of electronic device.

As such, each of electronic device 102 and system 106 may include an NFC interface 208, which can be used to engage in near field communication (NFC) with other NFC enabled devices. For example, NFC interface 208 may present a manner of establishing a communication link for data transfer between electronic device 102 and system 106.

In step 302, authentication information of a user, in the form of a username and password, is requested on computing system 106. As noted above, a user may be required to enter authentication information for different reasons. In one example, the user may be required to type in a username and password when initially logging into a computer or computer network. In another example, the user may have to manually provide a username and password when logging into certain websites. In yet another example, the user may be required to provide credit card information when shopping online. In the case of shopping online, the username and password as described herein can refer to any one or more of the name of the cardholder, the credit card number, the expiration date of the credit card, the security code, and any additional information for validation of a credit card transaction. Thus, in lieu of manual input by the user, the example of FIG. 3 provides for transmitting the username and password from electronic device 102 to computing system 106, where the username and password are stored on electronic device 102.

In step 304, a near field communication link is established between electronic device 102 and computing system 106. To establish an NFC link, a user may position (hereinafter referred to as "tap") NFC interface 208 of electronic device 102 to be within a predetermined distance (e.g., between 2 to 4 cm) of NFC interface 208 of computing system 106. Once the NFC link has been established, computing system 106 and electronic device 102 may communicate information between each other via the NFC link.

Prior to the start of establishing the NFC link, electronic device 102 may be in a "wake on NFC" mode. In this mode, NFC interface 208 of electronic device 102 may remain inactive until NFC interface 208 receives an NFC signal from another NFC interface 208. At the same time, NFC interface 208 of computing system 106 may be in a host mode. In the host mode, NFC interface 208 of computing system 106 may periodically emit NFC signals to seek out other nearby NFC interfaces 208.

The establishment of the NFC link in step 304 may begin with an initiation handshake. The initiation handshake may start when a user taps NFC interface 208 of electronic device 102 to NFC interface 208 of computing system 106. As mentioned above, while NFC interface 208 of computing system 106 may be in a host mode, NFC interface 208 of computing system 106 may periodically emit a ping message. For example, NFC interface 208 of computing system 106 may begin emitting the ping messages at step 302, when computing system 106 is requesting user authentication.

NFC interface 208 of electronic device 102 may receive the ping message, causing NFC interface 208 of electronic device 102 to awake. Subsequently, NFC interface 208 of electronic device 102 may reply with an acknowledgement message, which may be received by NFC interface 208 of computing system 106.

Computing system 106 and electronic device 102 may exchange device profiles following the initiation handshake. The device profiles may include a variety of information regarding the capabilities of computing system 106 and electronic device 102.

Furthermore, electronic device 102 and computing system 106 may authenticate one another, based at least in part on the previously-exchanged device profiles. In the device authentication, electronic device 102 or computing system 106 may determine whether the other is trusted using any number of authentication schemes. The establishment of the NFC link in step 304 may be cancelled if either electronic device 102 or computing system 106 fails to authenticate the other.

For example, electronic device 102 and computing system 106 may rely on a private key known to both devices, which may have been exchanged prior to the establishment of the NFC link in step 304. Alternatively, electronic device 102 and computing system 106 may rely on a combination of a public key and a private key. Using this scheme, electronic device 102 and computing system 106 may each exchange public keys associated with one another, or may obtain public keys from another source, such as a web service. Electronic device 102 and computing system 106 may verify the public keys with a certificate authority (e.g., over the Internet). For example, the web service may represent a certificate authority. If there is any link broken in the chain of trust, establishment of the NFC link may be terminated.

Following establishment of the NFC link in step 304, electronic device 102 and computing system 106 may remain in communication via the NFC link to transfer additional information. In the example of FIG. 3, electronic device 102 may transfer a username and password to computing system 106, where the username and password are configured to be used by the computing system 106 to authenticate a user on computing system 106.

In step 306 of FIG. 3, electronic device 102 retrieves a username and password from storage on electronic device 102. In this regard, the username and password are received and stored prior to establishment of the NFC link. For example, the username and password could be manually entered by a user of electronic device 102 and stored therein. The username and password could also be electronically transmitted to electronic device 102 (e.g., from computing system 106) by wired communication or wireless communication, including but not limited to NFC communication. It is possible that either of the username and password is encrypted.

In step 308, the username and password are transmitted from electronic device 308 to computing system 106 via the established NFC link. In step 310, computing system 106 performs authentication of the user using the username and password. For example, computing system 106 can provide the username and password to the application requesting the username and password on computing system 106. If either of the username and password is encrypted, decryption of the encrypted portions can occur, prior to computing system 106 providing the username and password to the requesting application.

The NFC link can then be terminated as shown in step 312. The NFC link can be terminated by a command from either NFC interface 208 of computing system 106 or NFC interface 208 of electronic device 102. Alternatively, the NFC link can be terminated when the electronic device 102 and computing system 106 move out of range from each other (e.g., beyond 4 cm). For example, computing system 106 can be a personal computer. Electronic device 102 can be used by the user for logging into the personal computer, or a network accessible by the personal computer, by establishing the NFC link. When finished with the computing session, the user can walk away with electronic device 102, thereby terminating the NFC link, and the computer can lock automatically.

The providing of username and password information by electronic device 102 to computing system 106 can be used in different contexts. For example, the NFC link can be established between electronic device 102 and computing system 106, and the providing of the username and password via the NFC link can be used for initially logging into a computer or computer network, for logging into certain websites, and for providing credit card information when shopping online.

The providing of the username and password can also be used for authentication of a user in a self-service library system. In this example, computing system 106 can act as a self-service counter, and each book available for checkout can be embedded with a radio-frequency identification (RFID) tag. To borrow books, a user can be authenticated by scanning electronic device 102 at computing system 106 via NFC over an established NFC link. In doing so, electronic device 102 can transmit a username and password, which was generated based on stored authentication information, to computing system 106. NFC interface 208 of electronic device 102 can subsequently be used to retrieve information from the RFID tags on the books desired for checkout by the user.

Figure 4:
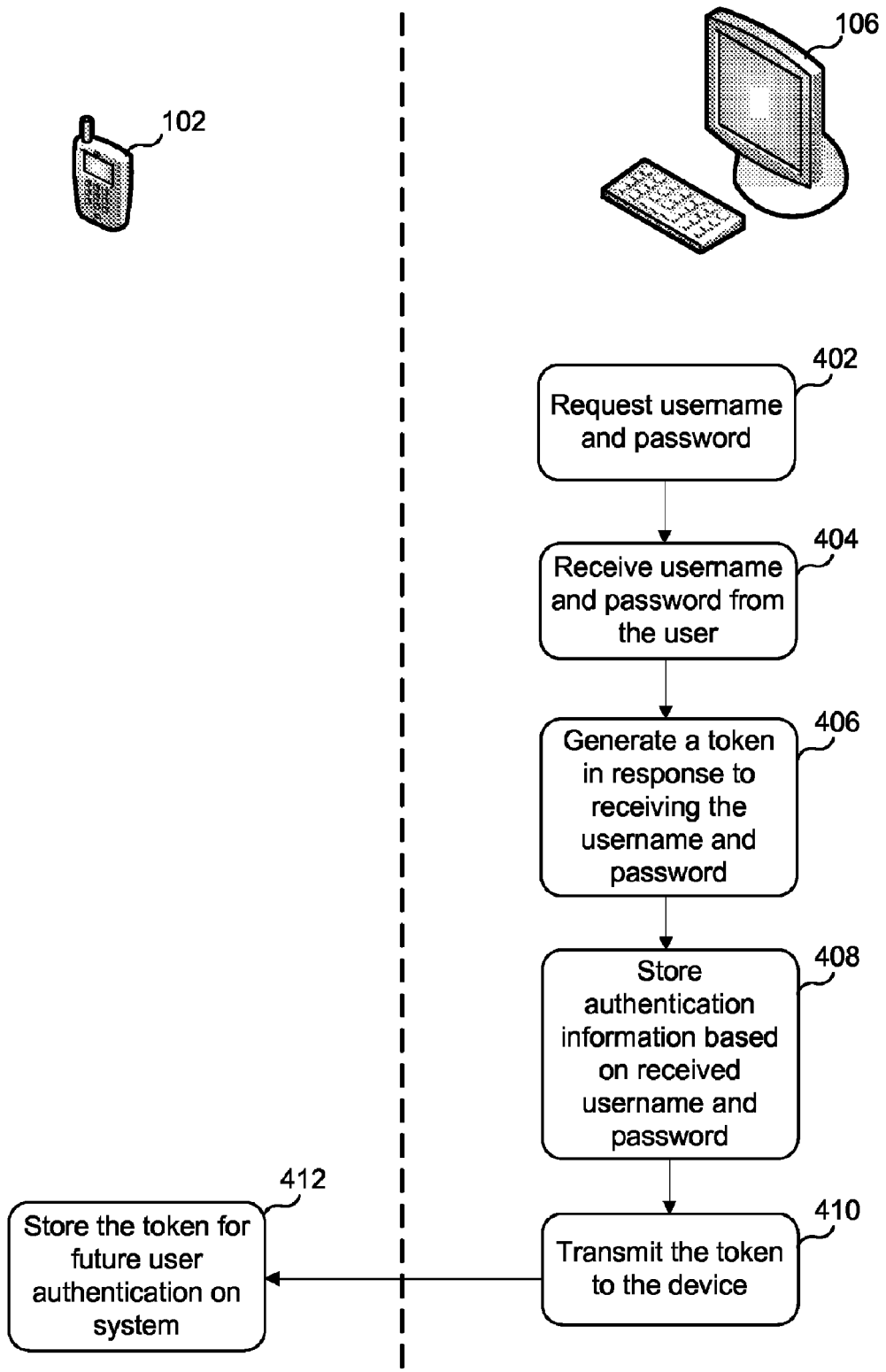
FIG. 4 illustrates a process by which a token is generated on a computing system and provided to an electronic device for future authentication of a user on the computing system.

FIG. 4 illustrates a process by which a token is generated on a computing system and provided to an electronic device for future authentication of a user on the computing system. As will be described below with reference to FIG. 5, this token can be provided by electronic device 102 to computing system 106 for authentication of a user on computing system 106. FIG. 4 illustrates an example process by which this token is generated.

In step 402, authentication information of a user, in the form of a username and password, is requested on computing system 106. As noted above, a user may be required to enter authentication information for different reasons (e.g., computer network, website, credit card information, self-service library system).

In step 404, the user manually enters the username and password on computing system 106. In response to receipt of a valid username and password, computing system 106 generates a token (or session key or cookie) in step 406. In the example of FIG. 4, the generated token can be used by electronic device 102 for future authentication with computing system 106. Thus, in step 408, computing system 106 stores authentication information based on the username and password received from the user. For example, this authentication information can directly correspond to the username and password. For enhanced security, the authentication information can instead correspond to a temporary key, token or session ID (e.g., as generated by an authentication server). Computing system may also store a local copy of the generated token, or other means for verifying future tokens received from devices (e.g., electronic device 102).

In step 410, computing system 106 transmits the token to electronic device 102. In step 412, electronic device 102 stores the token. By storing the token on electronic device 102, it is possible for electronic device 102 to authenticate a user on computing system 106, without requiring manual entry of a username and password by the user. Such authentication is described in FIG. 5.

Figure 5:
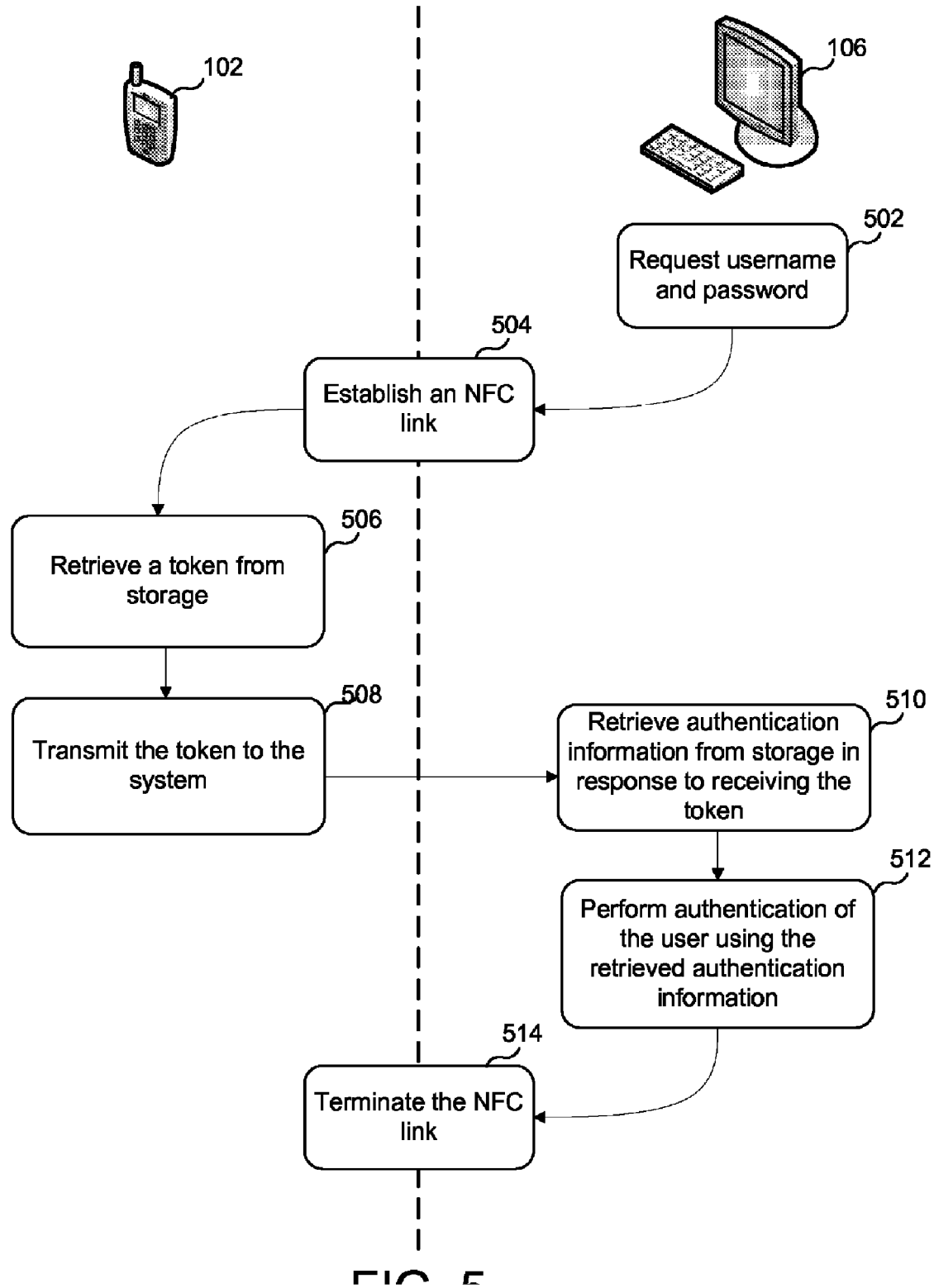
FIG. 5 illustrates a process by which a token is provided by an electronic device to a computing system for authentication of a user on the computing system.

FIG. 5 illustrates a process by which a token is provided by an electronic device to a computing system for authentication of a user on the computing system. It should be noted that although FIG. 5 depicts computing system 106 as a computer and electronic device 102 as a handheld device, each of computing system 106 and electronic device 102 may represent any embodiment of systems 200. As described above, system 200 can be a computer, phone, personal digital assistant (PDA), or any other sort of electronic device.

As such, each of electronic device 102 and system 106 may include an NFC interface 208, which can be used to engage in near field communication (NFC) with other NFC enabled devices. For example, NFC interface 208 may present a manner of establishing a communication link for data transfer between electronic device 102 and system 106.

In step 502, authentication information of a user, in the form of a username and password, is requested on computing system 106. As noted above, a user may be required to enter authentication information for different reasons (e.g., computer network, website, credit card information, self-service library system). In lieu of manual input by the user, the example of FIG. 5 provides for transmitting a token (or session key or cookie) from electronic device 102 to computing system 106, where the token is stored on electronic device 102.

In step 504, a near field communication link is established between electronic device 102 and computing system 106. The establishment of the NFC link in step 504 is similar to that described above with reference to step 304 of FIG. 3. Thus, a description for establishing the NFC link will not be described again with reference to FIG. 5.

After establishment of the NFC link, electronic device 102 and computing system 106 may remain in communication via the NFC link to transfer additional information. In the example of FIG. 5, electronic device 102 may transfer a token to computing system 106, where the token is configured to be used by the computing system 106 to authenticate a user on computing system 106.

In step 506 of FIG. 5, electronic device 102 retrieves a token from storage on electronic device 102. The token is received and stored prior to establishment of the NFC link, as described above with reference to FIG. 4. It is also possible that all of part of the token may be encrypted.

In step 508, the token is transmitted from electronic device 508 to computing system 106 via the established NFC link. In step 510, in response to receipt of the token from electronic device 102, authentication information, based on a username and password for authenticating the user, is retrieved from storage on computing system 106. In this regard, the authentication information was previously stored in computing system 106 as described above with reference to FIG. 4. For example, this authentication information can directly correspond to a stored username and password. For enhanced security, the authentication information can instead correspond to a stored temporary key (e.g., as generated by an authentication server). Thus, receipt of the token by computing system 106 can function as a validation of the user of electronic device 102, thus authorizing computing system 106 to provide its version of the stored authentication information to the requesting application (e.g., for computer, network or website login).

In step 512, computing system 106 performs authentication of the user using the authentication information retrieved from storage on computing system 106. Computing system 106 can simply provide the authentication information to the application requesting the username and password on computing system 106.

The NFC link can then be terminated as shown in step 514. The NFC link can be terminated by a command from either NFC interface 208 of computing system 106 or NFC interface 208 of electronic device 102. Alternatively, the NFC link can be terminated when the electronic device 102 and computing system 106 move out of range from each other (e.g., beyond 4 cm). For example, computing system 106 can a personal computer. Electronic device 102 can be used by the user for logging into the personal computer, or a network accessible by the personal computer, by establishing the NFC link. When finished with the computing session, the user can walk away with electronic device 102, thereby terminating the NFC link, and the computer can lock automatically.

The providing of a token by electronic device 102 to computing system 106 can be used in different contexts. For example, the NFC link can be established between electronic device 102 and computing system 106, and the providing of the token via the NFC link can be used for initially logging into a computer or computer network, for logging into certain websites, for providing credit card information when shopping online, and for authentication of a user in a self-service library.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for providing a username and password to a system apparatus using a personal device, the method comprising:

receiving, at a near field communication (NFC) interface of the personal device, a message from the system apparatus;

providing, in response to receiving the message, for the NFC interface of the personal device to awaken;

establishing, in response to awakening the NFC interface, an NFC link with the system apparatus via the NFC interface of the personal device, wherein the establishing comprises performing an initiation handshake with the system apparatus, exchanging device profile information with the system apparatus following the initiation handshake, and authenticating the system apparatus based on the exchanged device profile information;

receiving, at the personal device, an indication of a request for manual input for a username and password on the system apparatus;

retrieving, in response to the received indication of the request and instead of manual input from a user, the username and password from storage on the personal device;

encrypting the username and password; and transmitting, by the personal device, the encrypted username and password to the system apparatus via the NFC link, wherein the username and password are used for logging the user into the system apparatus.

2. The method of claim 1, further comprising:

terminating the NFC link with the system apparatus.

3. The method of claim 1, wherein the username and password are configured to be used by the system apparatus to log the user into the system apparatus for at least one of a network connected to the system apparatus, a web page session on the system apparatus, and a credit card transaction on the system apparatus.

4. The method of claim 1, wherein the username and password are configured to be used by the system apparatus to log the user into a library system, the library system being associated with books embedded with radio-frequency identification (RFID) tags for identification by the library system, with each RFID tag being configured to communicate identification information for a respective book to the personal device.

5. A personal device for providing a username and password for user login on a system apparatus, the personal device comprising:
  one or more processors; and
  a machine-readable medium comprising instructions stored therein, which when executed by the processors, cause the processors to perform operations comprising:
    receiving, at a near field communication (NFC) interface of the personal device, a message from the system apparatus;
    providing, in response to receiving the message, for the NFC interface of the personal device to awaken;
    establishing, in response to awakening the NFC interface, an NFC link with the system apparatus via the NFC interface of the personal device, wherein the establishing comprises performing an initiation handshake with the system apparatus, exchanging device profile information with the system apparatus following the initiation handshake, and authenticating the system apparatus based on the exchanged device profile information;
    receiving, at the personal device, an indication of a request for manual input for a username and password on the system apparatus;
    retrieving, in response to the received indication of the request and instead of manual input from a user, the username and password from storage on the personal device;
    encrypting the username and password; and
    transmitting, by the personal device, the encrypted username and password to the system apparatus via the NFC link,
    wherein the username and password are used for logging the user into the system apparatus.

6. The personal device of claim 5, wherein the username and password are configured to be used by the system apparatus to log the user into the system apparatus for at least one of a network connected to the system apparatus, a web page session on the system apparatus, and a credit card transaction on the system apparatus.

7. The personal device of claim 5, wherein the username and password are configured to be used by the system apparatus to log the user into a library system, the library system being associated with books embedded with radio-frequency identification (RFID) tags for identification by the library system, with each RFID tag being configured to communicate identification information for a respective book to the personal device.

8. A non-transitory machine-readable medium comprising instructions stored therein, which when executed by a personal device, cause the personal device to perform operations comprising:
  receiving, at a near field communication (NFC) interface of the personal device, a message from the system apparatus;
  providing, in response to receiving the message, for the NFC interface of the personal device to awaken;
  establishing, in response to awakening the NFC interface, an NFC link with the system apparatus via the NFC interface of the personal device, wherein the establishing comprises performing an initiation handshake with the system apparatus, exchanging device profile information with the system apparatus following the initiation handshake, and authenticating the system apparatus based on the exchanged device profile information;
  receiving, at the personal device, an indication of a request for manual input for a username and password on the system apparatus;
  retrieving, in response to the received indication of the request and instead of manual input from a user, the username and password from storage on the personal device;
  encrypting the username and password; and
  transmitting, by the personal device, the encrypted username and password to the system apparatus via the NFC link,
  wherein the username and password are used for logging the user into the system apparatus.

9. The machine-readable medium of claim 8, wherein the username and password are configured to be used by the system apparatus to log the user into the system apparatus for at least one of a network connected to the system apparatus, a web page session on the system apparatus, and a credit card transaction on the system apparatus.

10. The machine-readable medium of claim 8, wherein the username and password are configured to be used by the system apparatus to log the user into a library system, the library system being associated with books embedded with radio-frequency identification (RFID) tags for identification by the library system, with each RFID tag being configured to communicate identification information for a respective book to the personal device.

11. A machine-implemented method for performing user login on a system apparatus, the method comprising:
  transmitting a message to a personal device, to awaken a near field communication (NFC) interface of the personal device;
  establishing, in response to awakening the NFC interface of the personal device, an NFC link with the personal device via the NFC interface of the personal device, wherein the establishing comprises performing an initiation handshake with the personal device, exchanging device profile information with the personal device following the initiation handshake, and authenticating the personal device based on the exchanged device profile information;
  transmitting, by the system apparatus, an indication of a request for manual input for a username and password to the personal device;
  receiving, by the system apparatus and instead of manual input from a user, a stored version of the username and password from the personal device via the NFC link, wherein the received username and password are encrypted; and
  performing user login on the system apparatus using the stored version of the username and password received via the NFC link.

12. The method of claim 11, further comprising: terminating the NFC link with the personal device.

13. The method of claim 11, wherein the performing step performs user login on the system apparatus for at least one of a network connected to the system apparatus, a web page session on the system apparatus, and a credit card transaction on the system apparatus.

14. The method of claim 11, wherein the performing step performs user login on a library system, the library system being associated with books embedded with radio-frequency identification (RFID) tags for identification by the library system, with each RFID tag being configured to communicate identification information for a respective book to the personal device.

* * * * *